United States Patent [19]
Horiuchi et al.

[11] 3,901,763
[45] Aug. 26, 1975

[54] METHOD FOR THE PURIFICATION OF GLYCERO-LIPID-SPLITTING ENZYMES

[75] Inventors: Yoshifumi Horiuchi; Shigeyuki Imamura, both of Shizuoka, Japan

[73] Assignee: Toyo Jozo Kabushiki Kaisha, Shizuoka, Japan

[22] Filed: Mar. 11, 1974

[21] Appl. No.: 450,083

[30] Foreign Application Priority Data
Mar. 10, 1973 Japan.............................. 48-28425

[52] U.S. Cl............................ 195/66 R; 195/66 R
[51] Int. Cl.².................................... C07G 7/02
[58] Field of Search........ 195/66 R, 63, 68, DIG. 11

[56] References Cited
OTHER PUBLICATIONS
Zaborsky, Immobilized Enzymes, Published 1973 by CRC Press, (Division of the Chemical Rubber Co.).

Primary Examiner—Lionel M. Shapiro
Attorney, Agent, or Firm—Young & Thompson

[57] ABSTRACT

Enzymes acting on glycero-lipids, for example, lipase, phospholipase, lysophospholipase or phosphatidate phosphatase, are purified by the steps of: contacting an aqueous enzyme solution with a carrier which is a fatty acid ester of a water-insoluble polysaccharide or a derivative thereof containing hydroxyl groups, thereby to immobilize the same, and eluting the enzyme with a solution containing a surface active agent.

1 Claim, No Drawings

METHOD FOR THE PURIFICATION OF GLYCERO-LIPID-SPLITTING ENZYMES

This invention relates to a novel method for the purification of glycero-lipid-splitting enzymes, i.e. enzymes having substrate specificity for glycerides or glycerophosphatides.

Purification methods for enzymes employing chromatography are known. Among these, affinity chromatography is the most accurate separation method. However such a method is almost impossible to conduct as a large scale industrial process due to the complicated equipment and expensive carrier required.

As a result of various investigations performed by the present inventors on methods for the purification of enzymes having substrate specificity for glycerides or glycero-phosphatides, it has now been found that said enzymes can be specifically adsorbed by a carrier which is a fatty acid ester of a water-insoluble polysaccharide or a derivative thereof containing hydroxyl groups, and that the thus-adsorbed enzymes are not eluted by any change of pH or increase of ionic strength but can be easily eluted with a liquid containing a surface active agent.

The present invention thus provides a method for the purification of enzymes having substrate specificity for glycero-lipids, which comprises contacting a said enzyme with a carrier which is a fatty acid ester of a water-insoluble polysaccharide or a derivative thereof containing hydroxyl groups, and eluting the said enzyme with a liquid containing a surface active agent.

An object of the present invention is to increase specific activity of enzymes having substrate specificity for glycero-lipids with superior recovery.

Another object of the present invention is to provide a superior purification procedure for the enzymes including the purification of isozymes thereof.

In the present invention, the enzyme having substrate specificity for glycero-lipids is defined as an enzyme which hydrolyzes a lipid of the formula:

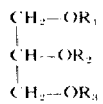

wherein $R_1$ and $R_2$ are hydrogen or an acyl group, especially a fatty acid residual group, $R_1$ and $R_2$ are not both hydrogen at the same time, and $R_3$ is hydrogen, an acyl group, especially a fatty acid residual group, a residual group of phosphoric acid, phosphryl choline, phosphoryl ethanol amine, phosphoryl serine, or phosphoryl inositol, and the said enzyme is generally designated as lipase, phospholipase A, B, C and D, phosphatidate phosphatase, lysophospholipase or the like.

The fatty acid esters of water-insoluble polysaccharides or derivatives thereof containing hydroxyl groups, which are used as carriers for purification of enzymes in accordance with the present invention, are obtained by any usual method such as esterification of water-insoluble polysaccharides or derivatives thereof containing hydroxyl groups with reactive derivatives of fatty acids, especially acid halides thereof.

Examples of the water-insoluble polysaccharides or derivatives thereof containing hydroxyl groups are natural plants fibers such as cotton, linen, jute or Manila hemp; cellulose fibers such as regenerated fibers (e.g. viscose rayon); cellulose powder; cellulose derivatives such as carboxmethyl-cellulose, phospho-cellulose, sulfomethyl-cellulose, sulfoethylcellulose, p-aminobenzyl-cellulose, aminoethyl-cellulose, diethylaminoethyl-cellulose, triethylaminoethyl-cellulose, or guanidinoethyl-cellulose; crosslinked gel of dextran-epichlorohydrin (hereinafter designated dextran gel); dextran gel derivatives such as carboxymethyl-dextran gel, diethylaminoethyl-dextran gel or sulfoethyl-dextran gel; and agar.

The cellulose derivatives may be chemically synthesized by any ordinary method [refer to *J. Am. Chem. Soc.*, 78, 751 (1956)] or, alternatively, commercially available ion exchangers of cellulose may be used.

The dextran gel may be prepared by known methods from crystalline dextran and epichlorohydrin. Commercially available dextran gels having various degrees of crosslinking, i.e. "Sephadex" (trade name), may also conveniently be used. As dextran gel derivatives, products prepared by carboxymethylation, diethylaminoethylation or sulfoethylation of dextran gels may preferably be used. However commercially available CM-Sephadex, DEAE-Sephadex or SE-Sephadex may also be used.

As fatty acids to be used for esterification, saturated or unsaturated fatty acids having six or more carbon atoms are advantageously used. These fatty acids may have either branched or straight chain structure. A mixture containing several kinds of fatty acids having different carbon drains may also be used.

According to the present invention, the enzyme having substrate specificity for glycero-lipids is treated by merely contacting a solution containing said enzyme with a carrier which is a fatty acid ester of polysaccharide as mentioned above. The treatment, therefore, may be performed batchwise or in a column.

The temperature and pH for that treatment may be varied freely, so long as no detrimental effect on the enzyme activity is caused. And it may preferably be carried out at 20° to 30°C. and at pH 7 to 8.

The fatty acid ester of polysaccharide has poor affinity for water, and therefore it is preferably subjected to pre-treatment with hydrophilic organic solvents such as acetone or lower alcohols.

The thus-adsorbed enzyme on a fatty acid ester of said polysaccharide is easily eluted by treating with a liquid containing a surface active agent, after washing.

In the process of the present invention, the surface active agent for eluting enzyme may preferably be selected by its superior eluting activity on the enzyme, so far as it does not denature the enzyme. For example, triton X-100 (trade name), adekatole 45-S-8 (trade name), BL-9-EX (trade name), tween 20 (trade name), tween 40 (trade name), cation FB (trade name), cation DT-205 (trade name), or sodium deoxychlolate may advantageously be used.

The concentration of surface active agent may vary according to the nature of the enzyme and of the surface active agent and it may preferably be more than 0.03 % (v/v).

In the present invention, fatty acid esters of water-insoluble polysaccharides or derivatives thereof containing hydroxyl groups used for the purification of enzyme solutions can be reused by washing with lower alcohols or acetone after removing the enzyme.

The effect of the surface active agents on enzyme activity and absorbability of the said enzyme to palmitoyl celluloses are measured using phospholipase A, C or D, lysophospholipase and phosphatidic acid phosphatase as the enzyme having a substrate specificity for glycero-lipids, together with using palmitoyl cellulose as a carrier. The results are shown in Table I.

1. Phospholipase A.

A reaction mixture containing purified egg yolk lecithin (1 μmole), NaCl (15 μmoles), CaCl₂ (2.3 μmoles), EDTA (0.013 μmole), ethyl ether (0.15 ml.) and Tryton X-100 (1.5 mg.) per 1.4 ml. was agitated Table 1

| surface active agent | concentration | phospholipase A i* | phospholipase A ii* | phospholipase C i* | phospholipase C ii* | phospholipase D i* | phospholipase D ii* | Lysophospholipase i* | Lysophospholipase ii* | phosphatidic acid phosphatase i* | phosphatidic acid phosphatase ii* |
|---|---|---|---|---|---|---|---|---|---|---|---|
| Triton X-100 | 0.001 V/V% | — | — | 126 | 99 | 100 | 48 | — | — | — | — |
|  | 0.005 | — | — | 127 | 89 | 111 | 15 | 119 | 63 | 106 | 32 |
|  | 0.01 | — | — | 122 | 18 | 112 | 3 | 119 | 47 | 132 | 19 |
|  | 0.03 | 100 | 60 | 113 | 0 | — | — | 115 | 44 | 141 | 1 |
|  | 0.2 | 100 | 33 | — | — | 115 | 0 | 118 | 39 | 153 | 0 |
|  | 0.5 | 100 | 7 | — | — | — | — | — | — | — | — |
| Adecatol 45-S-8 | 0.001 V/V% | — | — | 126 | 99 | 109 | 69 | — | — | — | — |
|  | 0.005 | — | — | 128 | 85 | 107 | 29 | 100 | 68 | 129 | 37 |
|  | 0.01 | — | — | 111 | 34 | 100 | 0 | 127 | 54 | 137 | 24 |
|  | 0.05 | 120 | 68 | 115 | 7 | — | — | 137 | 27 | 141 | 9 |
|  | 0.1 | 125 | 3 | — | — | 100 | 0 | 142 | 48 | 149 | 0 |
|  | 0.5 | 125 | 0 | — | — | — | — | 154 | 44 | — | — |
| Tween 20 | 0.05 V/V% | 105 | 31 | 121 | 72 | — | — | — | — | 148 | 4 |
|  | 0.1 | 100 | 23 | 103 | 0 | — | — | — | — | 159 | 0 |
|  | 0.2 | 100 | 27 | — | — | 0 | — | — | — | — | — |
|  | 0.5 | 100 | 29 | — | — | — | — | — | — | — | — |
| Deoxycholate Na | 0.001 V/V% | — | — | 104 | 100 | 90 | 65 | — | — | — | — |
|  | 0.01 | — | — | 113 | 85 | 81 | 41 | 145 | 44 | 122 | 90 |
|  | 0.03 | — | — | 106 | 25 | 82 | 34 | 139 | 39 | 147 | 63 |
|  | 0.1 | 105 | 0 | 100 | 0 | 50 | 0 | 133 | 46 | 147 | 10 |
|  | 0.2 | 110 | 0 | — | — | — | — | 120 | 41 | 147 | 6 |
|  | 0.5 | 100 | 0 | — | — | — | — | — | — | — | — |
|  | 1.0 | 100 | 20 | — | — | — | — | — | — | — | — |
| Cation FB | 0.05 V/V% | 0 | — | — | — | — | — | — | — | — | — |
|  | 0.1 | 37 | — | — | — | — | — | — | — | — | — |
|  | 0.2 | 67 | 100 | — | — | — | — | — | — | — | — |
|  | 0.5 | 100 | 3 | — | — | — | — | — | — | — | — |
| Cation DT 205 | 0.003 V/V% | — | — | 106 | 83 | — | — | — | — | 111 | 97 |
|  | 0.01 | — | — | 115 | 9 | — | — | — | — | 122 | 96 |
|  | 0.03 | — | — | 113 | 0 | — | — | — | — | 127 | 87 |
|  | 0.1 | — | — | 116 | 0 | 0 | — | — | — | 128 | 80 |
| None |  | 100 | 100 | 100 | 100 | 100 | 80 | 100 | 100 | 100 | 100 | i* = relative activity (%)
ii* = absorption ratio (%)

In Table 1, the assay method is as follows:

i. effect of surface active agent on enzyme actvity:

The relative ratio of enzyme activity was determined by the ratio of enzyme activity on enzyme solutions with or without surface active agent.

ii. effect of surface active agent on the absorbed enzyme on palmitoyl cellulose:

After absorbing the enzyme on palmitoyl cellulose as a carrier, surface active agent was added and stirred, and then the enzyme solution was separated from the carrier. The activity of enzyme solution separated with or without adding surface active agent was compared with the activity of the original enzyme solution (i.e. activity of enzyme solution before adding the carrier). The ratio of both activities is the relative activity.

As shown in Table 1, the surface active agent which elutes the enzyme absorbed on palmitoyl cellulose may preferably selected so as not to inhibit the enzyme activity and so as to have a concentration corresponding to a lower adsorption ratio (i.e. a higher elution ratio).

Activities of the enzymes having substrate specificity for glycero-lipids are assayed by the following procedures:

vigorously with a magnetic stirrer for 5 minutes. Then 1.4 ml. of the substrate mixture was adjusted to pH 8.0 with 0.01 N NaOH in a titration vessel for automatic titration recording apparatus.

The reaction was initiated by adding 0.1 ml. of enzyme solution to the thus-obtained mixture. The reaction rate was determined by titrating the liberated fatty acids with 0.01 N NaOH in the presence of nitrogen gas, while maintaining the pH at 8.0.

The enzyme activity capable of liberating 1 μmole of fatty acids per minute at 26°C. under the above conditions was defined as one unit.

2. Lysophospholipase.

To an enzyme solution (0.1 ml.) was added a reaction mixture (0.9 ml.) containing lysophospholipid (3.6 μmoles) and acetate buffer (pH 4.0, 200 μmoles) and the mixture was incubated at 37°C. for 30 minutes. After adding ethanol (20 ml.) to terminate the reaction, unreacted fatty acid ester was assayed by the hydroxamate method [J. M. Augustyn et al. Anal. Biochem., 31, 246–250 (1969)]. Enzyme activity was determined by decrease in the amount of ester. The optical absorption ratio of the colorized solution was determined by measuring the absorption at 525 mμ exactly 5 minutes after adding FeCl₃ ethanol solution. One μmole of decrease in the amount of fatty acid ester per 1 hour is designated as one unit.

3. Phospholipase C.

A reaction mixture containing egg yolk phosphatide (5.2 μmoles), CaCl₂ (5 μmoles), sodium deoxycholate (300 μg.) and tris-HCl buffer (100 μmoles at pH 7.5) per 1.9 ml., was subjected to supersonic treatment at 9 KC for 10 minutes, 180 W. To 1.9 ml. of this solution was added 0.1 ml. of enzyme solution and incubation was performed at 37°C. for 30 minutes.

After 30 minutes, the reaction was terminated by addition of 2.5% lauryl benzene sulfonate (0.9 ml.) and then 0.1 ml. of *E. coli* alkaline phosphatase (40 units: enzyme amount capable of hydrolyzing 40 μmoles of p-nitrophenyl phosphate at 37°C. at pH 7.5 per minute) was added to carry out the reaction at 37°C. for 30 minutes. The reaction was terminated by the addition of 1 ml. of trichloroacetic acid and the resulting mixture was supplemented with 1 ml. of 5% barium acetate to precipitate lauryl benzene sulfonate and unchanged phosphatide. Each 2 ml. of the filtrate obtained by removing the precipitate with filter paper was sampled in a test tube by centrifugation, and the quantity of inorganic phosphate was determined from the absorption at 720 mμ by the method of Allen modified by Nakamura [refer to J. Jap. Agr. Chem. Soc., 24, 1 (1950)]. Before the colorimetric analysis, the precipitate of barium sulfate formed should be removed centrifugally (3000 r.p.m., 10 minutes). The enzyme unit is the activity liberating 1 μmole of phosphorylcholine per hour under the above conditions.

4. Phospholipase D.

a. Preparation of substrate emulsion.

Ten egg yolks were blended in 500 ml. of cold acetone with a whirling blender and thereafter left to stand. The precipitate formed thereby was collected by filtration, washed twice with 200 ml. of cold acetone, and admixed with 300 ml. of chloroform-methanol (1:1) mixture to extract phosphatide. The insoluble portion was separated by filtration.

The extraction procedure with this mixture was repeated twice. The extract was concentrated under reduced pressure until the solvent was removed, whereupon 300 ml. of acetone were added to the concentrate, which was left to stand for 24 hours at −10°C. The precipitate formed was collected by filtration, dissolved in 100 ml. of ethyl ether and stored at −10°C. to provide egg yolk phosphatide (170 μmoles of phosphatide/ml.).

5 μmoles of this egg yolk phosphatide were mixed with 0.1 ml. of ethyl ether, 100 μmoles of acetate buffer solution (pH 5.5), 200 μmoles of CaCl₂ and deionized water to a total volume of 1.5 ml. The mixture was subjected to supersonic treatment at 0°C. for 10 minutes to prepare the substrate emulsion.

b. Procedure.

To 1.5 ml. of the substrate emulsion prepared in the above manner was added 0.5 ml. of enzyme solution. After thorough mixing, 0.5 ml. of ethyl ether was quickly layered, whereby the reaction was carried out at 37°C. for 20 minutes. After the reaction was over, 1.0 ml. of 30% trichloroacetic acid was added to the reaction mixture. After the mixture was left to stand at 0°C. for 10 minutes, 2 ml. of deionized water was added thereto and the precipitate was removed by filtration. The filtrate was kept at 60°C. for 10 minutes to remove ethyl ether. After cooling on ice bath, to 2.0 ml. of the filtrate was added 0.2 ml. of 15.7% I₂-20% KI solution. The mixture was left to stand for 20 minutes and then subjected to centrifugal separation (3000 r.p.m., 10 minutes, at 5°C.). The supernatant solution was removed by aspiration by the use of a capillary tube. The precipitate was dissolved in 10 ml. of 1, 2-dichloro ethane. The amount of choline was measured by the increase in absorbance at 365 mμ.

The enzyme activity unit is that liberating 1 μmole of choline per hour under the above conditions.

5. Phosphatidate phosphatase.

a. Preparation of substrate emulsion.

One ml. of phosphatidic acid (51 μmole/ml.) was put in a supersonic treatment vessel followed by volatilization of the ethyl ether and admixture with 5 ml. of purified water. The mixture was further subjected to supersonic treatment (9KC, 180W) at 0°C. for 10 minutes to prepare the substrate emulsion.

b. Procedure for assay of enzyme activity.

The reaction was started by the addition of 0.1 ml. enzyme solution into 0.9 ml. of a reaction mixture containing 0.1 ml. of the phosphatidic acid as described above, 0.5 M acetate buffer solution (0.1 ml.), 0.01 M CaCl₂ solution (0.1 ml.) and deionized water (0.6 ml.). The reaction was carried out at 37°C. for 30 minutes, and terminated by the addition of 1.0 ml. of 10% trichloroacetic acid. Then 1.0 ml. of 1% serum albumin solution was added to the mixture and mixed well. Unaltered substrate and protein were removed by centrifugation (3000 r.p.m., 10 minutes). The supernatant solution was analyzed similarly as described in Method 3 hereinbefore.

The enzyme activity unit was that liberating 1 μmole of inorganic phosphoric acid at 37°C. per minute under the above conditions.

6. Lipase.

a. Preparation of emulsion.

One liter of deionized water containing 18.5 g. of a polyvinyl alcohol and 1.5 g. of another polyvinyl alcohol was warmed with stirring at 75° to 85°C. for 1 hour, thereafter cooled and filtered to prepare a PVA solution.

Into a homogenizer vessel of stainless steel were charged 75 ml. of the PVA solution and 23 g. of olive oil and, after homogenization at 11,000 r.p.m. at 0°C. to 5°C. for 10 minutes, PVA-olive oil emulsion was secured. This emulsion must be used within 24 hours after it has been left to stand at 0° to 5°C. for 1 hour.

b. Method of reaction.

Into a test tube 24 mm. in diameter and 200 mm. in length were introduced the phosphate buffer solution (2 ml.) and the PVA emulsion (5 ml.). After stirring for about 3 seconds with a vibrator, preincubation was effected at 37°C. for 10 minutes. Then, one ml. of the enzyme solution was added to this mixture and, after stirring with a vibrator for about 3 seconds, the reaction was initiated. After 20 minutes, the reaction was terminated by addition of 20 ml. of ethanol-acetone mixture (1:1).

The free fatty acids in the resultant reaction mixture were titrated with 0.05 N NaOH, while bubbling the mixture by passing nitrogen gas therethrough, by the use of 3 to 5 drops of 1% alcoholic phenolphthalein as indicator. On the other hand, the reaction mixture without enzyme solution was mixed with 20 ml. of the ethanol-acetone mixture, followed by addition of the enzyme solution, to prepare a control mixture, which was titrated similarly as hereinabove mentioned.

The difference between the two titration values corresponds to the amount of fatty acids liberated by lipase.

c. Calculation of unit of enzyme activity.

The amount of enzyme which liberates 1 μmole of fatty acids per minute at 37°C. was defined as one unit.

Accordingly, the activity unit of lipase was calculated from the titration values according to the following equation:

$$\text{Lipase unit (u)} = \frac{\text{Difference in titration values}}{\text{Sample amount in 1 ml. of enzyme solution}} \times 2.5$$

The following examples illustrate the invention.

EXAMPLE 1

2.0 g. of palmitoyl ester of cellulose were immersed in 50% aqueous acetone solution, packed in a column of 1.2 × 9 cm. and washed with water. 20 mg. of lyophilized snake venom was dissolved in 60 ml. of 10 mM tris-HCl buffer solution (pH 8.0) and centrifuged at 5000 r.p.m. for 5 minutes. The resulting supernatant solution was charged into the above column packed with palmitoyl ester of cellulose, and passed through at a flow rate of 50 ml./hour. Then the column was washed thoroughly with water and thereafter was eluted with 0.1% Adekaton 45-S-8 and 10 mM tris-HCl buffer (pH 8.0) at an elution rate of 50 ml./hour to obtain 5 ml. of each fraction and the phospholipase A active fractions were collected. The activity ratio of crude enzyme to eluted enzyme was assayed by the enzyme activity and amount of protein determined by Lowry's method [J. Biol. Chem., 193, 265 (1951)]. The results were as follows:

|  | Relative Activity (u./mg. protein) | Recovery (%) |
|---|---|---|
| Crude Enzyme Solution | 38 | 100 |
| Eluted Solution | 250 | 108 |

Palmitoyl ester of gauze was prepared as follows:

3 g. of dry gauze and 20 ml. of palmitic acid chloride were added to 80 ml. of pyridine and the reaction was carried out at 30°C. with stirring, for 12 hours. To the reaction mixture was added 200 ml. of chloroformethanol mixture (1:1) and the reaction product was collected by filtration. The product was washed again with 200 ml. of chloroform-ethanol mixture (1:1), further washed with 200 ml. of ethanol and dried to obtain 3.7 g. of palmitoyl ester of gauze.

EXAMPLE 2

Example 1 was repeated, but the palmitoyl ester of gauze was replaced by the following carriers to purify snake venom:

|  | Relative Activity (u/mg. protein) | Recovery (%) |
|---|---|---|
| Oleyl Ester of Cellulose | 240 | 96 |
| Palmitoyl Ester of Sephadex G-25 | 170 | 101 |
| Caproyl Ester of Agar | 194 | 94 |

EXAMPLE 3

To portions of finely cut cabbage (100 g.) rich in chlorophyll was added cold deionized water (100 ml.). After stirring by means of a whirling blender for 5 minutes, the mixture was filtered with gauze. The filtrate was subjected to centrifugation (10,000 r.p.m., 20 minutes, at 0°C.) and the supernatant solution was used as a crude enzyme solution.

Palmitoyl ester of agar (4 g.) was immersed in 50% ethanol, packed in a column of 1.2 × 10 cm. and washed with water. Thereafter cabbage extract as hereinabove prepared was passed through the aforesaid column at a flow rate of 60 ml./hr. Then after washing with water, the column was eluted with 0.05% Adekatol 45-S-8 and 0.01 M phosphate buffer (pH 7.0) at a flow rate of 50 ml./hr. Eluate was collected in fractions of 10 ml. each thereby to obtain phospholipase D-rich fractions. The relative activities of crude enzyme and eluate were determined by the same procedure as in Example 1:

|  | Relative Activity (u/mg. protein) | Recovery (%) |
|---|---|---|
| Crude Enzyme Solution | 27 | 100 |
| Eluate | 1050 | 120 |

The caproyl ester of agar as a carrier was prepared as follows:

3 g. of agar powder and 15 ml. of caproic acid chloride were added to 50 ml. of pyridine-acetone mixture (1:1). After the reaction proceded at 30°C. with stirring for 10 hours, the reaction product was washed twice with 50 ml. of ethanol and dried to obtain 3.9 g. of caproyl ester of agar.

EXAMPLE 4

In Example 3, caproyl ester of agar was replaced by the following carriers to purify the cabbage extract:

|  | Relative Activity (u/mg. protein) | Recovery (%) |
|---|---|---|
| Caproyl Ester of Defatted Cotton | 980 | 110 |
| Palmitoyl Ester of p-aminobenzyl cellulose | 870 | 105 |
| Eraidoyl Ester of Agar | 1030 | 116 |

EXAMPLE 5

*Bacillus cereus* IAM-1208 was inoculated to 100 ml. of a liquid culture medium (pH 7.0) containing peptone (1 g.), meat extract (1 g.) and NaCl (0.5 g.) and shake cultured at 30°C. for 20 hours. After 20 hours cultivation, the culture broth was subjected to centrifugal separation (5000 r.p.m., 20 minutes, at 0°C.) to remove bacterial cells. The resulting supernatant solution was used as a crude phospholipase C solution.

2.0 g. of palmitoyl ester of cellulose were immersed in 50% ethanol, packed in a column of 1.2 × 10 cm. and washed with 0.01 M tris-HCl buffer (pH 7.5). The crude enzyme solution (200 ml.) as hereinabove produced was passed through the column at a rate of 150 ml./hr.

Then after washing with 0.01 M-tris-HCl buffer solution the column was eluted with 0.03% Adekatol 45-S-8 and 0.01 M-tris-HCl buffer solution (pH 7.5) at a flow rate of 150 ml./hr. to collect fractions of 15 ml. each. The obtained fractions showed phospholipase C activity. The relative activities of the crude enzyme solution and of the eluate were assayed by the method described in Example 1, as follows:

|  | Relative Activity (u/mg. protein) | Recovery (%) |
|---|---|---|
| Crude Enzyme Solution | 6.5 | 100 |
| Eluate | 1970 | 104 |

EXAMPLE 6

In Example 5, palmitoyl ester of gauze was replaced by the following carriers, and the phospholipase C was purified and assayed:

|  | Relative Activity (u/mg. protein) | Recovery (%) |
|---|---|---|
| Palmitoyl Ester of Cotton Cloth | 1740 | 98 |
| Oleoyl Ester of CM-Sephadex | 1780 | 94 |
| Eraidoyl Ester of DEAE-Cellulose | 1850 | 102 |

EXAMPLE 7

*Penicillium notatum* IFO 4640 was inoculated into 100 ml. of a liquid culture medium (pH 5.4) containing corn steep liquor (3.5 g.), lactose (5.5 g.), soy bean oil (0.25 g.), CaCO$_3$ (1.0 g.) and KH$_2$PO$_4$ (0.7 g.) and shake cultured at 26°C. for 5 days. After cultivation, mycelial cake was obtained by filtration and washed with deionized water. Then to 5.0 ml. of deionized water was added 1 g. (wet weight) of mycelia, and this was crushed in a whirling blender for 10 minutes at ambient temperature (12,000 r.p.m.). The mycelial homogenate was adjusted to pH 7.0 and filtered. The filtrate was centrifuged at 10,000 r.p.m. for 10 minutes at 0°C. to obtain the supernatant liquid showing lysophospholipase activity.

2 g. of oleoyl ester of gauze were immersed in 50% ethanol, packed in a column of 1.2 × 9 cm. and washed with 0.01 M acetate buffer solution (pH 5.0) containing 1 M NaCl. A solution (20 ml.) of the same buffer containing 5 ml. of the mycelial extract was passed through the column at a flow rate of 150 ml./hr. After washing with the same buffer solution, the enzyme was eluted with 0.01% sodium deoxycholate and 0.01 M phosphate buffer (pH 7.0), and fractions of 6 ml. each gathered. The lysophospholipase-active fractions were assayed:

|  | Relative Activity (u/mg. protein) | Recovery (%) |
|---|---|---|
| Crude Enzyme Solution | 153 | 100 |
| Eluate | 4290 | 67 |

EXAMPLE 8

In example 7, oleoyl ester of gauze was replaced by the following carriers:

|  | Relative Activity (u/mg. protein) | Recovery (%) |
|---|---|---|
| Caproyl Ester of Agar | 4100 | 65 |
| Oleoyl Ester of DEAE-Sephadex | 3760 | 62 |
| Lauroyl Ester of Sephadex G-25 | 3800 | 64 |

EXAMPLE 9

*Streptomyces mirabilis* was inoculated into a liquid medium (pH 6.5ml.) containing peptone (1 g.), glucose (0.5 g.) corn starch (0.5 g.), NaCl (0.3 g.) and MgSO$_4$ (0.05 g.), shake cultured at 26°C. for 3 days and the culture broth was filtered. To the filtrate (80 ml.) were added barium acetate (1.6 g.) and NaCl (2.4 g.). The precipitate thereby formed was removed centrifugally (5000 r.p.m., 10 minutes) and the supernatant solution was provided as crude phosphatidate phosphatase solution (0.18 μ/ml.).

Palmitoyl ester of cellulose (1.5 g.) was immersed in 50% ethanol, packed in a column of 1.2 × 9 cm. and then washed thoroughly with deionized water. Into the column was fed the crude phosphatide phosphatase solution (80 ml.) as prepared hereinabove at a flow rate of 150 ml./hr. Then the column was washed successively with 1.5% NaCl solution (10 ml.), 0.75% NaCl solution (10 ml.) and 0.1% NaCl solution (50 ml.). After washing, the enzyme was eluted with 0.1% Adekatol 45-S-8 at a flow rate of 150 ml./hr. and the thus-obtained eluate was fractionated into fractions of 15 ml. each. Phosphatidate phosphatase active fractions were collected and assayed as follows:

|  | Relative Activity (u/mg. protein) | Recovery (%) |
|---|---|---|
| Crude Enzyme Solution | 0.044 | 100 |
| Eluate | 5.8 | 98 |

EXAMPLE 10

Palmitoyl ester of gauze (35 g.) was immersed in 50% aqueous acetone solution, packed in a column and washed with water. Then an aqueous solution of lipase (250 ml., 75 μ/ml., 40 μ/mg. protein) was passed through the column, followed again by washing with water (1000 ml.). The enzyme was eluted with 0.3% Adekatol 45-S-8 (100 ml.). The eluate was concentrated to 20 ml. in vacuo in the presence of silicone oil as an antiform agent, thereafter acetone (30 ml.) was added to precipitate the material. The precipitate was centrifugally removed and to the supernatant was further added acetone (50 ml.). The precipitate formed thereby was collected, dissolved in 10 ml. of water and then freeze dried to obtain 24 mg. of lipase powder (potency: 400 μ/mg. protein).

Having described our invention, we claim:

1. A method for the purification of an enzyme having substrate specificity to glycero-lipids selected from the group consisting of glycerides and glycero-phosphatides, which comprises the steps of:

contacting an aqueous solution of a said enzyme with a carrier selected from the group consisting of fatty acid esters of water-insoluble polysaccharides and derivatives thereof containing hydroxyl groups, said fatty acid having at least 6 carbon atoms, and eluting the adsorbed enzyme with an aqueous solution of a surface active agent.

* * * * *